US012355652B2

(12) United States Patent
Bagchi et al.

(10) Patent No.: US 12,355,652 B2
(45) Date of Patent: Jul. 8, 2025

(54) FUNCTIONAL TESTING OF NF DEVICE

(71) Applicant: Rakuten Symphony, Inc., Tokyo (JP)

(72) Inventors: Sandeep Bagchi, Bangalore (IN); Nayan Sen, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/014,058

(22) PCT Filed: Dec. 27, 2022

(86) PCT No.: PCT/US2022/082401
§ 371 (c)(1),
(2) Date: Dec. 30, 2022

(87) PCT Pub. No.: WO2024/107235
PCT Pub. Date: May 23, 2024

(65) Prior Publication Data
US 2024/0223487 A1    Jul. 4, 2024

(30) Foreign Application Priority Data
Nov. 14, 2022  (IN) .............................. 202241065147

(51) Int. Cl.
*H04L 43/50* (2022.01)
*G06F 11/3668* (2025.01)

(52) U.S. Cl.
CPC .......... *H04L 43/50* (2013.01); *G06F 11/3684* (2013.01); *G06F 11/3688* (2013.01)

(58) Field of Classification Search
CPC ... H04L 43/50; G06F 11/3684; G06F 11/3688
(Continued)

(56) References Cited

U.S. PATENT DOCUMENTS

| 7,000,224 B1 * | 2/2006 | Osborne | ............. | G06F 11/3688 |
| | | | | 717/125 |
| 8,369,225 B2 * | 2/2013 | Sun | ......................... | H04L 43/50 |
| | | | | 709/224 |

(Continued)

FOREIGN PATENT DOCUMENTS

| WO | WO-2018209138 A1 * | 11/2018 | ............. | G06F 21/31 |
| WO | WO-2024107235 A1 * | 5/2024 | .......... | G06F 11/3684 |

OTHER PUBLICATIONS

International Search Report and Written Opinion for International Patent Application No. PCT/US2022/082401 mailed May 1, 2023.

*Primary Examiner* — Anthony Mejia
(74) *Attorney, Agent, or Firm* — Sughrue Mion, PLLC

(57) ABSTRACT

Embodiments herein disclose an electronic device for performing functional testing of a NF device. A processor is configured to receive a specification corresponding to a service to be tested on a DUT and generate a proto file based on the specification, where the proto file comprises a plurality of messages and definitions associated with a plurality of RPCs for enabling communication with a test harness manager. The processor is further configured to generate a plurality of test scripts based on the generated proto file; invoking, by the electronic device, at least one RPC of the plurality of RPCs based on at least one test script to be executed on the DUT; and perform the functional testing based on the invoked at least one RPC for testing the at least one method of the service on the DUT, where the DUT is the NF device.

14 Claims, 7 Drawing Sheets

(58) Field of Classification Search
USPC .......................................................... 370/241
See application file for complete search history.

(56) References Cited

U.S. PATENT DOCUMENTS

| | | | |
|---|---|---|---|
| 9,563,527 B2* | 2/2017 | Yamane | G06F 11/2635 |
| 11,748,178 B2* | 9/2023 | Bachmutsky | G06F 8/44 |
| | | | 719/312 |
| 2018/0089068 A1* | 3/2018 | Bhojan | G06F 8/61 |

* cited by examiner

FUNCTIONAL TESTING OF NF DEVICE

CROSS-REFERENCE TO RELATED APPLICATIONS

The present application claims priority to and is the 35 U.S.C. § 371 United States National Phase application based on International Patent Application No. PCT/US22/82401, filed Dec. 27, 2022, and entitled "Functional Testing of NF Device." which claims priority to Indian Patent Application number 202241065147 to Sandeep Bagchi et al., filed Nov. 14, 2022, and entitled "Functional Testing of NF Device," and incorporates their disclosures herein by reference in their entireties.

FIELD OF INVENTION

The present disclosure relates to testing devices, and more specifically related to a method and electronic device for performing functional testing of a network function (NF) device.

BACKGROUND

In general, functional test framework means a developer is able to write some functional tests. Also, while writing the test scripts there needs to be a GLUE between the scripting language (for example, PYTHON) and higher performing languages such as for example C, C++, etc. Existing mechanisms for performing functional test allows a developer to write test scripts. There are certain functions that are exposed such as the CODEC and the transport layer and the developers will be able to call the functions which are exposed using the test scripts. The test scripts are a set of conditions or variables under which a tester determines whether a device under test (DUT) functions as desired. The test scripts are collected into test suites. In order to fully test the DUT requirements are met, usually at least two test cases (i.e., a positive test and a negative test) are needed for each requirement.

However, in most of the testing scenarios a user is required to provide the test scripts in specific languages which is compatible with the DUT. This requires the developer to know the specific languages compatible with the DUT. As a result, not all developers will be able to provide the test scripts. Also, there may be a requirement to involve a greater number of developers to be able to provide the test scripts in the specific languages which would make the process of testing costly and cumbersome. Thus, it is desired to at least provide a mechanism for auto focus that is devoid of the above issues.

OBJECT OF INVENTION

The principal object of the embodiments herein is to provide a method and an electronic device for performing functional testing of a network function (NF) device. In the proposed method, test scripts use gRPC APIs for executing test sequence on the NF device. Therefore, the proposed method is language neutral allowing a user to provide test scripts in language, irrespective of language of execution on test harness manager or test harness application provided in the test harness manager.

SUMMARY

Accordingly, embodiments herein disclose an electronic device for performing functional testing of a network function (NF) device. The electronic device includes a memory, a processor and a communicator. The processor is configured to receive a specification corresponding to a service to be tested on a device under test (DUT) and generate a proto file based on the specification, wherein the proto file comprises a plurality of messages and definitions associated with a plurality of Remote Procedure Calls (RPCs) for enabling communication with a test harness manager of the electronic device. The specification comprises a plurality of methods of the service to be tested. The processor is further configured to generate a plurality of test scripts based on the generated proto file; invoking, by the electronic device, at least one RPC of the plurality of RPCs based on at least one test script to be executed on the DUT: and perform the functional testing based on the invoked at least one RPC for testing the at least one method of the service on the DUT, wherein the DUT is the NF device.

In an embodiment, the plurality of RPCs comprises a set of codec RPCs, a set of transport RPCs, a set of response RPCs and a set of RPCs for retrieval of messages.

In an embodiment, each of the plurality of test scripts are configured to populate at least one message of the plurality of messages and call at least one RPC of the plurality of RPCs.

In an embodiment, the processor is configured to generate the proto file based on the specification includes parse the received specification corresponding to the service to be tested on the DUT and generate the plurality of messages. The processor is further configured to add the set of codec RPCs for encoding the plurality of messages, wherein the set of codec RPCs encodes a binary encoding of a protobuf to a format corresponding to the specification: add the set of transport RPCs for sending at least one of a request and a response from the at least one test script to the DUT: and generate the proto file comprising the plurality of messages and the added plurality of RPCs.

In an embodiment, the processor is configured to perform the functional testing based on the invoked at least one RPC for testing the at least one method of the service on the DUT includes determine the invoked at least one RPC: populate at least one message of the plurality of messages associated with the invoked at least one RPC and call at least one codec RPC of the set of codec RPCs for encoding the at least one message of the plurality of messages. The processor is further configured to call at least one transport RPC of the set of transport RPCs to send test data and send the test data to the DUT for testing the at least one method of the service on the DUT. Also, the processor is configured to call at least one response RPCs of the set of response RPCs for fetching response from the DUT and at least one response RPCs for retrieval of the messages of the set of RPCs for retrieval of messages from the DUT: call at least one codec RPC of the set of codec RPCs for decoding at least one of a fetched response and the retrieved message from the DUT: and perform the functional testing by validating the decoded response and the retrieved message from the DUT.

In an embodiment, the processor is configured to determine asynchronous communication between the electronic device and the DUT and determine a set of messages sent to the DUT queued in the test harness manager. Further, the processor is configured to retrieve the set of messages queued in the test harness manager by implementing a message repository, wherein the set of RPCs for retrieval of messages are used for retrieving the set of messages.

Accordingly, embodiments herein disclose a method for performing functional testing of a network function (NF) device by an electronic device. The method includes receiving, by the electronic device, a specification corresponding to a service to be tested on a device under test (DUT) and generating, by the electronic device, a proto file based on the specification, wherein the proto file comprises a plurality of messages and definitions associated with a plurality of Remote Procedure Calls (RPCs) for enabling communication with a test harness manager of the electronic device. The specification comprises a plurality of methods of the service to be tested. The method also includes generating, by the electronic device, a plurality of test scripts based on the generated proto file: invoking, by the electronic device, at least one RPC of the plurality of RPCs based on at least one test script to be executed on the DUT: and performing, by the electronic device, the functional testing based on the invoked at least one RPC for testing the at least one method of the service on the DUT, wherein the DUT is the NF device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
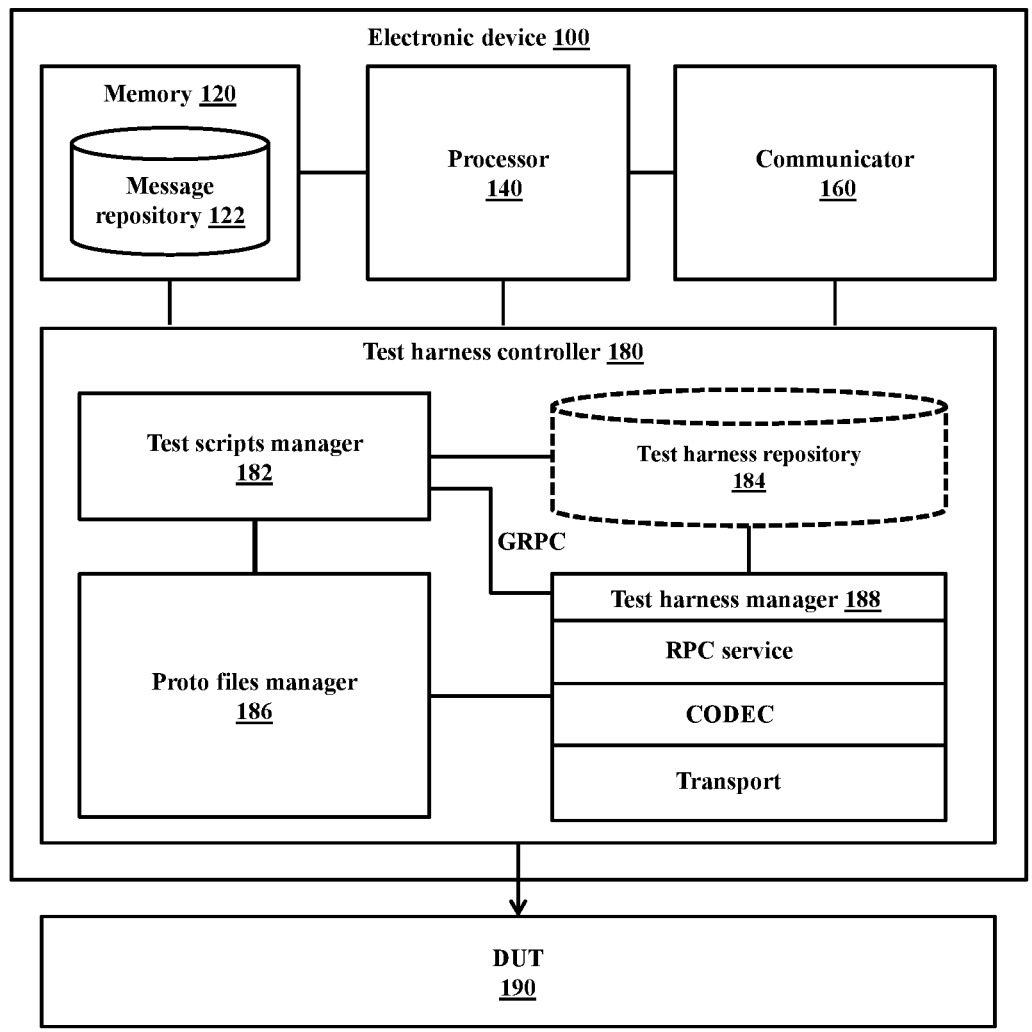
FIG. 1 illustrates a block diagram of an electronic device for performing functional testing of a network function (NF) device, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose an electronic device for performing functional testing of a network function (NF) device. The electronic device includes a memory, a processor and a communicator. The processor is configured to receive a specification corresponding to a service to be tested on a device under test (DUT) and generate a proto file based on the specification, wherein the proto file comprises a plurality of messages and definitions associated with a plurality of Remote Procedure Calls (RPCs) for enabling communication with a test harness manager of the electronic device. The specification comprises a plurality of methods of the service to be tested. The processor is further configured to generate a plurality of test scripts based on the generated proto file; invoking, by the electronic device, at least one RPC of the plurality of RPCs based on at least one test script to be executed on the DUT: and perform the functional testing based on the invoked at least one RPC for testing the at least one method of the service on the DUT, wherein the DUT is the NF device.

Accordingly, embodiments herein disclose a method for performing functional testing of a network function (NF) device by an electronic device. The method includes receiving, by the electronic device, a specification corresponding to a service to be tested on a device under test (DUT) and generating, by the electronic device, a proto file based on the specification, wherein the proto file comprises a plurality of messages and definitions associated with a plurality of Remote Procedure Calls (RPCs) for enabling communication with a test harness manager of the electronic device. The specification comprises a plurality of methods of the service to be tested. The method also includes generating, by the electronic device, a plurality of test scripts based on the generated proto file: invoking, by the electronic device, at least one RPC of the plurality of RPCs based on at least one test script to be executed on the DUT: and performing, by the electronic device, the functional testing based on the invoked at least one RPC for testing the at least one method of the service on the DUT, wherein the DUT is the NF device.

Conventional methods and systems for performing functional testing may require that each NF node which needs to be used to test a device under test (DUT) be separately available. This leads to increase in cost of the testing process.

Unlike to the conventional methods and systems, the proposed method includes a test harness manager which emulates large number of NF nodes based on test scripts. Therefore, the proposed method allows the DUT to be tested by the large number of NF nodes without increasing the cost. The proposed method is cost effective and increases efficiency of the testing process.

In the conventional methods and systems, a developer providing the test scripts to the DUT needs to provide the test scripts in specific language which is compatible with the DUT. Therefore, this adds on to the burden on the developer and may require developers with specific language knowledge to develop the test script.

Unlike to the conventional methods and systems, the proposed method includes the test harness manager which is stateless and is dependent on the test script. Therefore, as long as the gRPC APIs are supported for the specific language the developer need not know the specific language and provide the test script in the specific language. But the user will have to call the RPC to invoke the application which will intern perform the actions like execute the test sequence.

Unlike to the conventional methods and systems, the proposed method includes providing developers with RPCs that can be used to call an application and the application will respond to the RPC calls by performing certain actions that are implemented.

Referring now to the drawings, and more particularly to FIGS. 1 through 4, where similar reference characters denote corresponding features consistently throughout the figures, there are shown preferred embodiments.

FIG. 1 illustrates a block diagram of an electronic device (100) for performing functional testing of a network function (NF) device (190), according to an embodiment as disclosed herein.

In an embodiment, the electronic device (100) includes a memory (120), a processor (140), a communicator (160) and a test harness controller (180). The electronic device (100) can be for example any device which is used for testing a device under test (DUT) i.e., the NF device (190). The test harness management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The FIG. 1 indicates the test harness management controller (180) out of the processor (140). However, the test harness management controller (180) can be incorporated within the processor (140) or as part of any other processor/processors or can in itself be a processor.

The memory (120) includes a message repository (122) which is configured to store a set of messages sent to the DUT (190) queued at a test harness manager (188) and a set of RPCs are provided for retrieval of messages. The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the test harness controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the electronic device (100) and with external devices via one or more networks.

In an embodiment, the test harness controller (180) includes a test scripts manager (182), a test harness repository (184), a proto files manager (186) and a test harness manager (188).

In an embodiment, the test scripts manager (182) is configured to receive a specification corresponding to a service to be tested on the NF device (190). The specification includes multiple methods of the service to be tested. For example, consider that the NF device (190) is a 5G node. Then the specification can be for example OpenAPI.

Further, the test scripts manager (182) is configured to determine asynchronous communication between the electronic device and the DUT and determine a set of messages sent to the DUT queued in the test harness manager. The test scripts manager (182) is configured to retrieve the set of messages queued in the test harness manager by implementing a message repository, wherein the set of RPCs for retrieval of messages are used for retrieving the set of messages. Therefore, the test scripts manager (182) implements the test scripts using the services provided by the test harness manager (188), thus the data driven testcases can be implemented. The services include populate the message using JSON Data, invoke CODEC RPC to Encode the Message to desired format, invoke the TRANSPORT RPC to Send data to the DUT (190) and invoke MESSAGE RECEIVE RPC to receive message and responses from the DUT (190) for later processing.

In an embodiment, the test harness repository (184) is configured to store a plurality of predefined test scripts in a specific language. For example, the test harness repository (184) may include test scripts in GO language. The tester can use the predefined test scripts to write further code to generate the test sequence to test the DUT (190). The test harness repository (184) also includes helper APIs which the tester can use to build the test sequence on. However, the test harness repository (184) is an optional entity (as indicated by dotted lines in the FIG. 1) as raw client stubs may be generated and used by the tester directly than using the predefined test scripts available in the test harness repository (184).

In an embodiment, the proto files manager (186) is configured to parse the received specification corresponding to the service to be tested on the DUT (190) and generate the plurality of messages. The proto files manager (186) is configured to add the set of codec RPCs for encoding the plurality of messages and add the set of transport RPCs for sending at least one of a request and a response from the at least one test script to the DUT (190), and generate the proto file which includes the plurality of messages and the added plurality of RPCs. The set of codec RPCs encodes a binary encoding of a protobuf to a format corresponding to the specification. The RPCs can be for example gRPC. The gRPC is an open-source high performance Remote Procedure Call (RPC) framework that has the capability to run in any environment. The gRPC connects with services in and across data centres with pluggable support for load balancing, tracing, health checking and authentication. The gRPC is used in distributed computing to connect devices, mobile applications and browsers to backend services.

Here a particular language is determined corresponding to a language of the plurality of test scripts. The plurality of gRPC APIs corresponds to requests, responses and names of the service associated with the plurality of methods of the service to be tested.

In an embodiment, the test harness repository (184) is configured to generate a plurality of test scripts based on the proto file. A test script includes a set of conditions or variables under which a tester determines whether the DUT (190) functions as desired. In order to fully test the DUT requirements are met, usually at least two test cases (i.e., a positive test and a negative test) are needed for each requirement.

In an embodiment, the test harness manager (188) is configured to invoke at least one gRPC API of the plurality of gRPC APIs from the proto file based on the at least one test script to be executed on the NF device (190). For example, if the NF device (190) is the 5GC then the test script invokes a gRPC API which is used to create a Hypertext Transfer Protocol (HTTP) session between the test harness manager (188) and the 5GC. The gRPC is used to automatically generate idiomatic client and server stubs for the methods in the service in a variety of languages and platforms.

The test harness manager (188) is configured to perform the functional testing based on the invoked at least one gRPC API for testing the at least one method of the service on the DUT (190). Here, the testing includes executing test sequence associated with the invoked at least one gRPC API through the test harness manager (188) on the DUT (190). In an example, if a centralized unit (CU) is the DUT (190) then the test harness manager (188) emulates say for example, role of an Access and Mobility Management Function (AMF) node and sends the test sequence to the CU for testing the CU. Here the AMF node is emulated based on the test script. The specification corresponding to the service to be tested on the DUT (190) is translated into serial structured test sequence using protocol buffers.

Therefore, the test harness manager (188) provides the following services to the test script such as for example but not limited to list of RPC supported, CODEC RPC—used for encoding and decoding messages, TRANSPORT RPC—Sending data to DUT, MESSAGE RETRIEVE RPC—Used for retrieving messages/responses received from DUT and ability to filter data.

At least one of the plurality of modules/components of the test harness controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function of the electronic device (100).

Figure 2A:
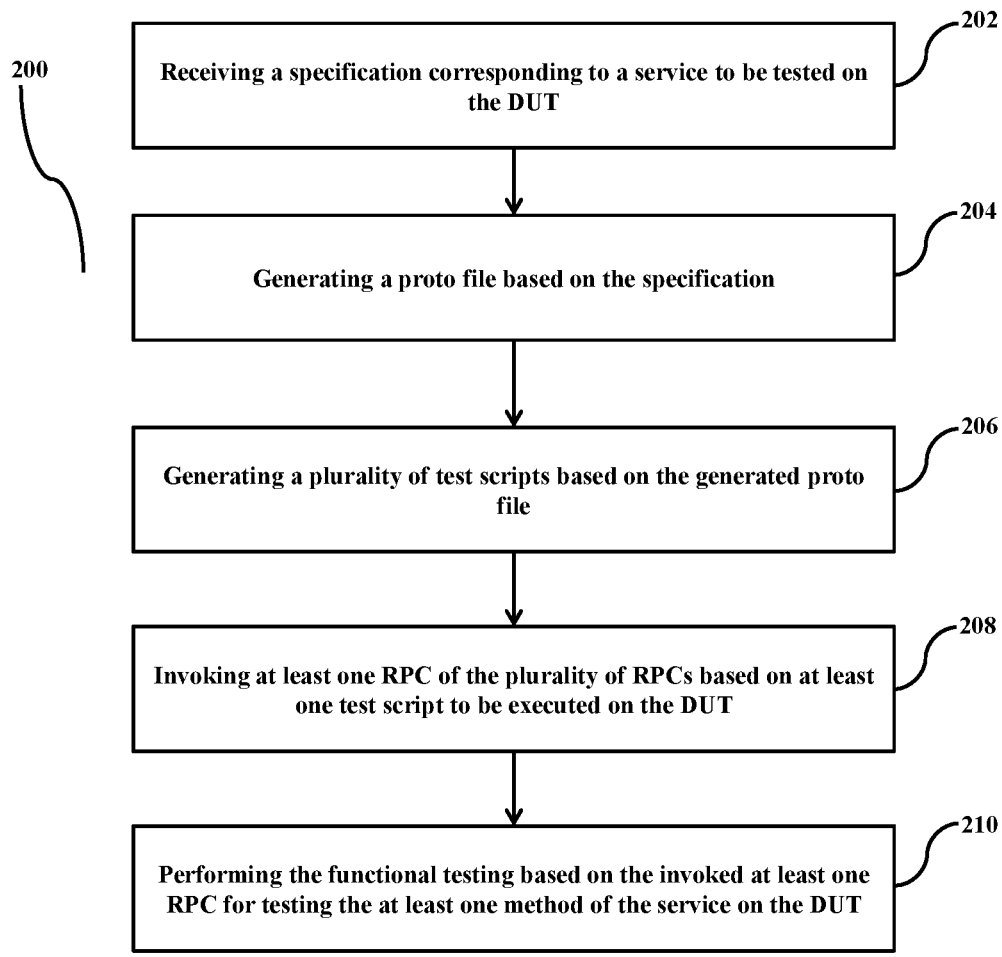
FIG. 2A is a flow diagram illustrating a method for performing the functional testing of the NF device, according to an embodiment as disclosed herein.

FIG. 2A is a flow diagram (200) illustrating a method for performing the functional testing of the DUT (190), according to an embodiment as disclosed herein.

Referring to the FIG. 2A, at step 202, the method includes the electronic device (100) receiving the specification corresponding to the service to be tested on the DUT (190). For example, in the electronic device (100) described in the FIG.

1, the test harness controller (180) is configured to receive the specification corresponding to the service to be tested on the DUT (190).

At step 204, the method includes the electronic device (100) generating the proto file based on the specification. For example, in the electronic device (100) described in the FIG. 1, the test harness controller (180) is configured to generate the proto file based on the specification.

At step 206, the method includes the electronic device (100) generating the plurality of test scripts based on the generated proto file. For example, in the electronic device (100) described in the FIG. 1, the test harness controller (180) is configured to generate the plurality of test scripts based on the generated proto file.

At step 208, the method includes the electronic device (100) invoking at least one RPC of the plurality of RPCs based on at least one test script to be executed on the DUT (190). For example, in the electronic device (100) described in the FIG. 1, the test harness controller (180) is configured to invoke at least one RPC of the plurality of RPCs based on at least one test script to be executed on the DUT (190).

At step 210, the method includes the electronic device (100) performing, by the electronic device, the functional testing based on the invoked at least one RPC for testing the at least one method of the service on the DUT (190). For example, in the electronic device (100) described in the FIG. 1, the test harness controller (180) is configured to perform the functional testing based on the invoked at least one RPC for testing the at least one method of the service on the DUT (190).

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 2B:
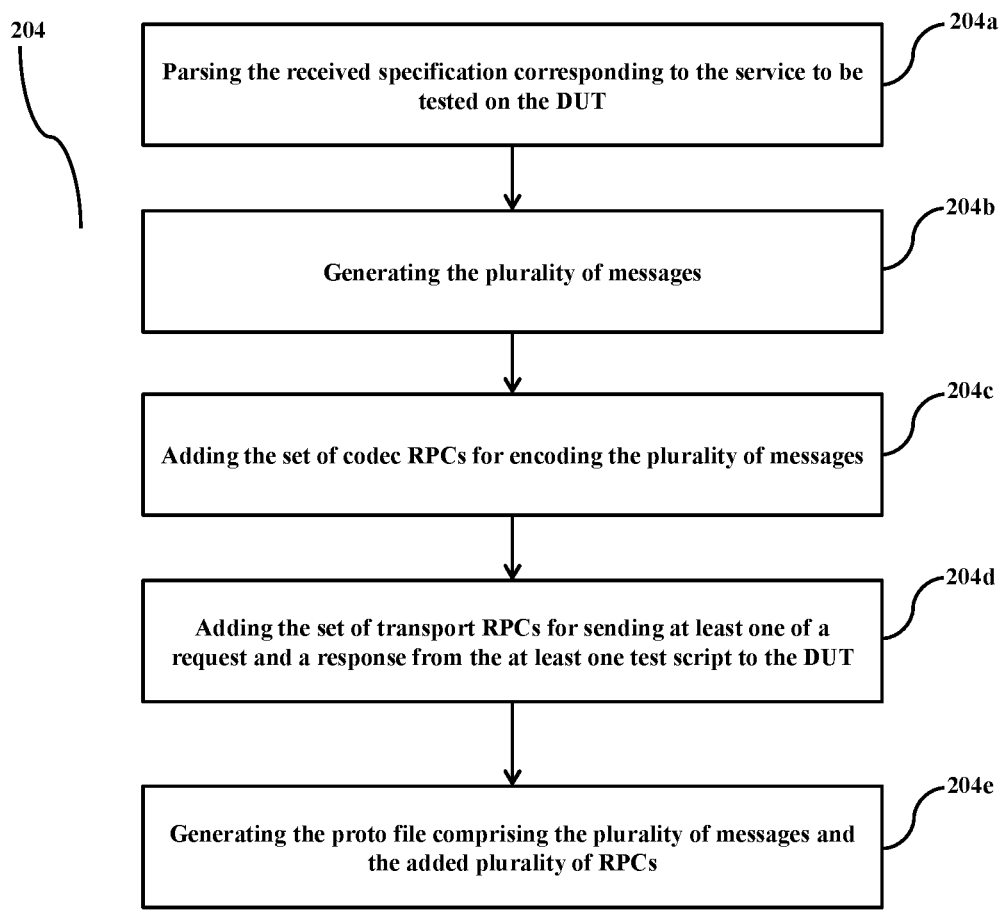
FIG. 2B is a flow diagram illustrating a method for generating proto file based on a plurality of test scripts, according to an embodiment as disclosed herein.

FIG. 2B is a flow diagram (204) illustrating a method for generating the proto file based on the specification by the electronic device (100), according to an embodiment as disclosed herein.

Referring to the FIG. 2B, at step 204a, the method includes the electronic device (100) parsing the received specification corresponding to the service to be tested on the DUT (190). For example, in the electronic device (100) described in the FIG. 1, the test harness controller (180) is configured to parse the received specification corresponding to the service to be tested on the DUT (190).

At step 204b, the method includes the electronic device (100) generating the plurality of messages. For example, in the electronic device (100) described in the FIG. 1, the test harness controller (180) is configured to generate the plurality of messages. Example from NAS, PFCP, ASNI (NGAP, RRC, S1AP, F1AP . . . ), OpenAPI (3GPP 5G Core . . . ), Yang (O-RAN).

At step 204c, the method includes the electronic device (100) adding the set of codec RPCs for encoding the plurality of messages. For example, in the electronic device (100) described in the FIG. 1, the test harness controller (180) is configured to add the set of codec RPCs for encoding the plurality of messages.

At step 204d, the method includes the electronic device (100) adding the set of transport RPCs for sending at least one of a request and a response from the at least one test script to the DUT (190). For example, in the electronic device (100) described in the FIG. 1, the test harness controller (180) is configured to add the set of transport RPCs for sending at least one of a request and a response from the at least one test script to the DUT (190). Transport can be for example but not limited to SCTP, HTTP2, NETCONF, etc.

At step 204e, the method includes the electronic device (100) generating the proto file comprising the plurality of messages and the added plurality of RPCs. For example, in the electronic device (100) described in the FIG. 1, the test harness controller (180) is configured to generate the proto file comprising the plurality of messages and the added plurality of RPCs.

Figure 2C:
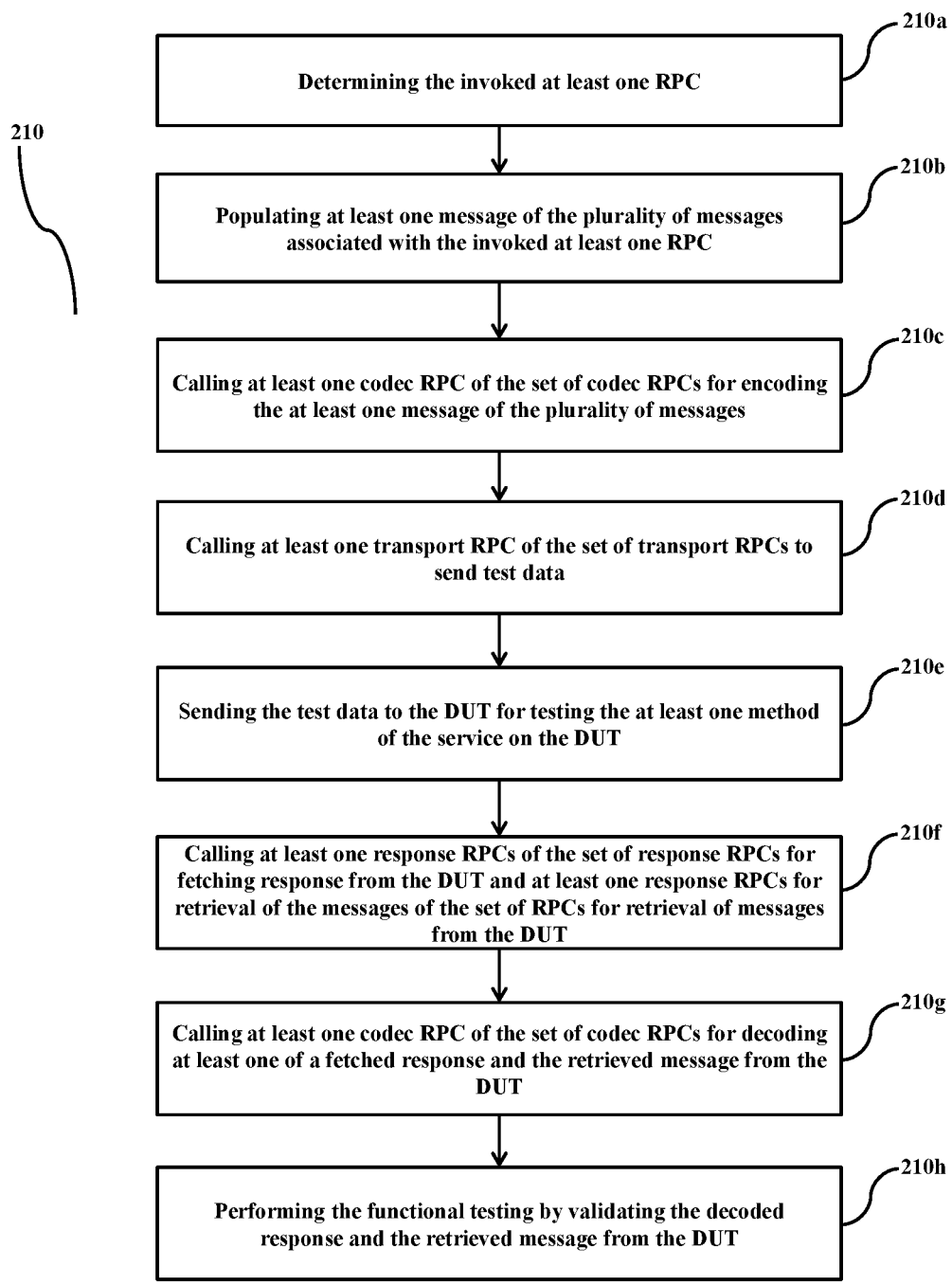
FIG. 2C is a flow diagram illustrating a method for performing the functional testing based on the invoked at least one RPC for testing the at least one method of the service on the DUT, according to an embodiment as disclosed herein.

FIG. 2C is a flow diagram (210) illustrating a method for performing the functional testing based on the invoked at least one RPC for testing the at least one method of the service on the DUT, according to an embodiment as disclosed herein.

Referring to the FIG. 2C, at step 210a, the method includes the electronic device (100) determining the invoked at least one RPC. For example, in the electronic device (100) described in the FIG. 1, the test harness controller (180) is configured to determine the invoked at least one RPC.

At step 210b, the method includes the electronic device (100) populating the at least one message of the plurality of messages associated with the invoked at least one RPC. For example, in the electronic device (100) described in the FIG. 1, the test harness controller (180) is configured to populate the at least one message of the plurality of messages associated with the invoked at least one RPC.

At step 210c, the method includes the electronic device (100) calling at least one codec RPC of the set of codec RPCs for encoding the at least one message of the plurality of messages. For example, in the electronic device (100) described in the FIG. 1, the test harness controller (180) is configured to call at least one codec RPC of the set of codec RPCs for encoding the at least one message of the plurality of messages.

At step 210d, the method includes the electronic device (100) calling at least one transport RPC of the set of transport RPCs to send test data. For example, in the electronic device (100) described in the FIG. 1, the test harness controller (180) is configured to call at least one transport RPC of the set of transport RPCs to send test data.

At step 210e, the method includes the electronic device (100) sending the test data to the DUT (190) for testing the at least one method of the service on the DUT (190). For example, in the electronic device (100) described in the FIG. 1, the test harness controller (180) is configured to send the test data to the DUT (190) for testing the at least one method of the service on the DUT (190).

At step 210f, the method includes the electronic device (100) calling at least one response RPCs of the set of response RPCs for fetching response from the DUT (190) and at least one response RPCs for retrieval of the messages of the set of RPCs for retrieval of messages from the DUT (190). For example, in the electronic device (100) described in the FIG. 1, the test harness controller (180) is configured to call at least one response RPCs of the set of response RPCs for fetching response from the DUT (190) and at least one response RPCs for retrieval of the messages of the set of RPCs for retrieval of messages from the DUT (190).

At step 210g, the method includes the electronic device (100) calling at least one codec RPC of the set of codec RPCs for decoding at least one of a fetched response and the retrieved message from the DUT (190). For example, in the electronic device (100) described in the FIG. 1, the test harness controller (180) is configured to call at least one codec RPC of the set of codec RPCs for decoding at least one of a fetched response and the retrieved message from the DUT (190).

At step 210h, the method includes the electronic device (100) performing the functional testing by validating the decoded response and the retrieved message from the DUT (190). For example, in the electronic device (100) described in the FIG. 1, the test harness controller (180) is configured to perform the functional testing by validating the decoded response and the retrieved message from the DUT (190).

Figure 2D:
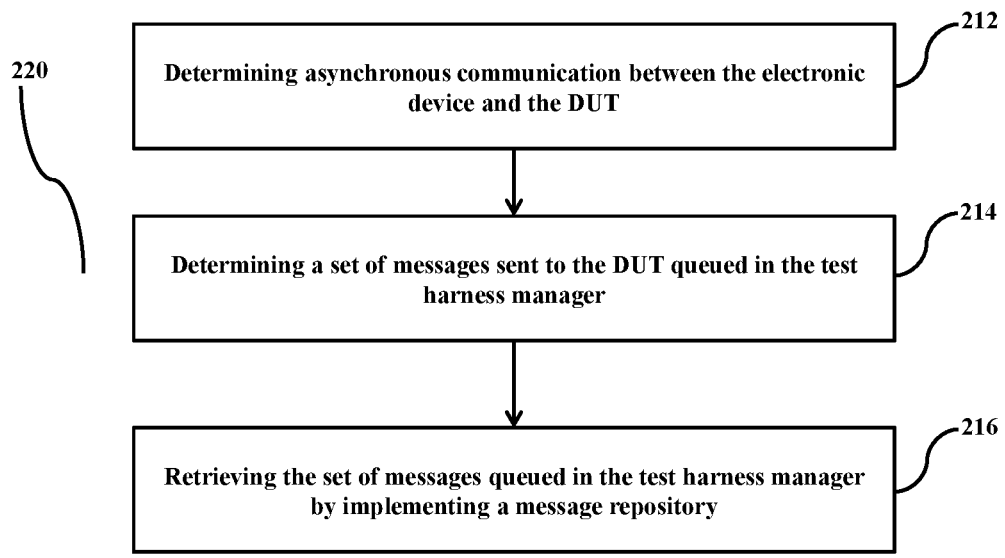
FIG. 2D is a flow diagram illustrating a method for retrieving messages queued in the test harness manager, according to an embodiment as disclosed herein.

FIG. 2D is a flow diagram (220) illustrating a method for retrieving messages queued in the test harness manager (188), according to an embodiment as disclosed herein.

Referring to the FIG. 2D, at step 212, the method includes the electronic device (100) determining asynchronous communication between the electronic device (100)) and the DUT (190). For example, in the electronic device (100) described in the FIG. 1, the test harness controller (180) is configured to determine asynchronous communication between the electronic device (100) and the DUT (190).

At step 214, the method includes the electronic device (100) determining the set of messages sent to the DUT queued in the test harness manager (188). For example, in the electronic device (100) described in the FIG. 1, the test harness controller (180) is configured to determine the set of messages sent to the DUT queued in the test harness manager (188).

At step 216, the method includes the electronic device (100) retrieving the set of messages queued in the test harness manager (188) by implementing the message repository (122). For example, in the electronic device (100) described in the FIG. 1, the test harness controller (180) is configured to retrieve the set of messages queued in the test harness manager (188) by implementing the message repository (122).

Figure 3:
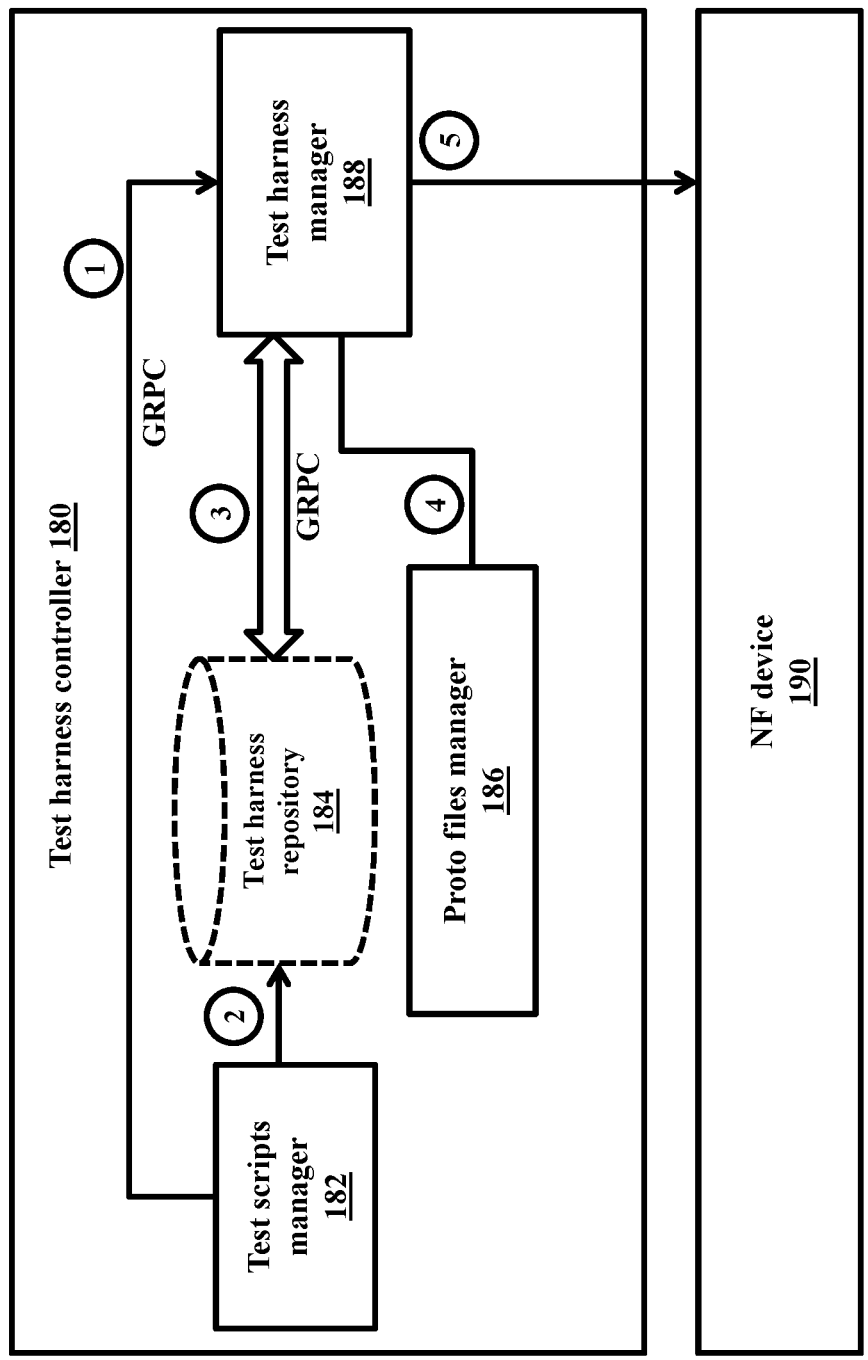
FIG. 3 illustrates connections and functioning of a Test harness controller of the electronic device, according to an embodiment as disclosed herein.

FIG. 3 illustrates connections and functioning of the test harness controller (180) of the electronic device (100), according to an embodiment as disclosed herein.

Referring to the FIG. 3, the framework for performing the functional test using the test harness controller (180) is provided. At step 1, the test scripts manager (182) communicates directly with the test harness manager (188) through the gRPC APIs. The test scripts manager (182) instructs the test harness manager (188) based on the test scripts the language and the methods of the service to be tested on the NF device (190). Here the tester/developer may have to write the entire test script for testing the methods of the service on the NF device (190). Further, the developers are provided with the gRPCs that can be used to call the testing application at the test harness manager (188) and the test harness manager (188) will respond to the gRPC calls by performing certain actions that are to be implemented.

In another embodiment, at step 2, the test scripts manager (182) does not directly interact with the test harness manager (188). Here, the test harness repository (184) includes client stubs generated for specific languages of the test script such as for example the GO language. In such a scenario, the developer need not write the entire code for performing the testing and can build the test code on the client stubs which are available in the test harness repository (184).

The proto files manager (186) includes the gRPC APIs which are called when the test scripts need to be executed. The proto files will include the definition for the gRPCs and the signature that will be supported by the test harness manager (188). The proto file is similar to a JSON file and represents structured data. But the user can run a compiler on the proto file to generate the client stubs which can be used to read and write the data in the programming language of the user's choice.

Here, the test harness manager (188) emulates specific NF nodes based on the test scripts and sends the test sequence to the NF device (190). The NF device (190) believes that the test sequence is received from the specific NF nodes and responds to the same. Hence the NF device (190) is tested for the functionality.

The NF device (190) is the device under test and can be any device which communicates through the protocols supported by the test harness manager (188). Therefore, the proposed method allows the user to test the NF device (190) by emulating various elements at the test harness manager (188). The test harness manager (188) includes the non-intelligent application which is stateless and works in a slave mode with the test script being master. The test harness manager (188) is not protocol dependent.

Benefits of Using gRPC:
1. Polyglot nature of gRPC i.e., irrespective of the language in which the application at the test harness manager (188) is written, the test script which is executing on the test harness manager (188), may or may not be written in the same language as the application at the test harness manager (188). As long as the language supports the RPC call, the language can be used to execute the test script on the test harness manager (188).
2. gRPC provides automated generation of client stubs.
3. gRPC provides ABSTRACTION which includes message-passing nature of network communication is hidden from the user.
4. gRPC often omits many of the protocol layers to improve performance.
5. gRPC enables the usage of the applications in the distributed environment, not only in the local environment.

The RPC channels are used for remote procedure calls from the test scripts manager (182) to the test harness manager (188). Any test scripts that need to be transmitted to the test harness manager (188) may be sent over the gRPC channel by calling a predefined function or the gRPC APIs. The test harness manager (188) may or may not return any data back to the test scripts manager (182) as a result of the procedure call. Thus, the RPC channel includes RPC input data communicated from the test scripts manager (182) to the test harness manager (188).

Figure 4:
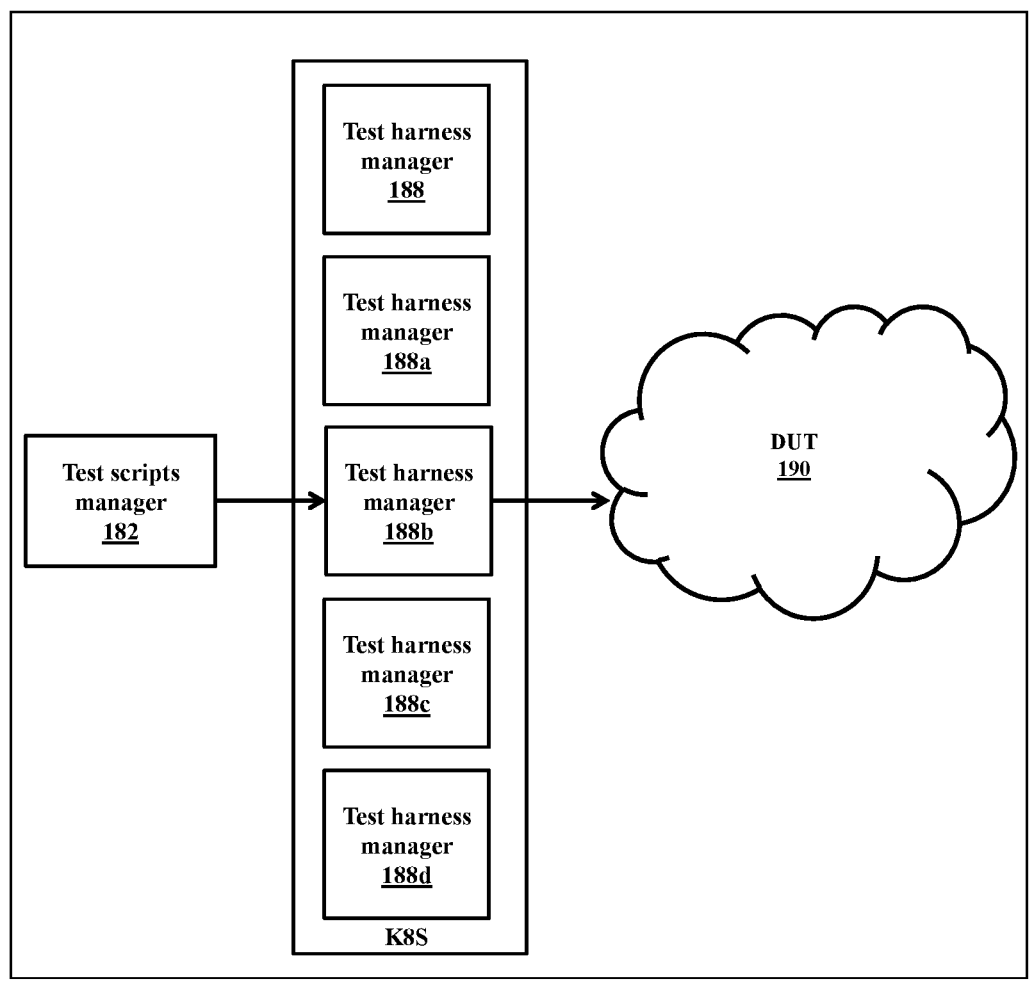
FIG. 4 is an example for performing loaded testing of the DUT, according to an embodiment as disclosed herein.

FIG. 4 is an example for performing the loaded testing of the DUT (190), according to an embodiment as disclosed herein.

Referring to the FIG. 4, the test harness manager (188) is the main application or entity which is the core of the electronic device (100) and hence the test harness manager (188) can be scaled out horizontally in Kubernetes environment. The Kubernetes (also known as k8s or "kube") an open-source container orchestration platform for automation of many of the manual processes involved in deploying, managing, and scaling containerized applications. The test scripts can send requests to each of the test harness managers (188a-N) or through parallelism for performing the load testing or capacity testing of the DUT (190). The testing method can be implemented to test the 5GC. Further, the proposed method can be deployed in any cloud server such as for example, example, Amazon Web Services R, Azure®, Google Cloud Platform®.

In another example, consider that the DUT (190) has interaction with 10 different types of the nodes. Therefore, the user need not physically have all the 10 different types of the nodes but the test harness manager (188) with the test scripts can be used to send or receive messages which emulate the 10 different types of the nodes with respect to the DUT (190). Therefore, the proposed method is a cost-effective solution as compared to all the existing mechanisms. This design can be extended for both functional and performance testing.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. An electronic device for performing functional testing of a network function (NF) device, wherein the electronic device comprises:
    a memory;
    a processor coupled to the memory;
    a communicator coupled to the memory and the processor and wherein the processor is configured to:
        receive a specification corresponding to a service to be tested on a device under test (DUT), wherein the specification comprises a plurality of methods of the service to be tested;
        generate a proto file based on the specification, wherein the proto file comprises a plurality of messages and definitions associated with a plurality of Remote Procedure Calls (RPCs) for enabling communication with a test harness manager of the electronic device:
        generate a plurality of test scripts based on the generated proto file;
        invoking, by the electronic device, at least one RPC of the plurality of RPCs based on at least one test script to be executed on the DUT; and
        perform the functional testing based on the invoked at least one RPC for testing the at least one method of the service on the DUT, wherein the DUT is the NF device.

2. The electronic device as claimed in claim 1, wherein the processor is configured to generate the proto file based on the specification comprises:
    parse the received specification corresponding to the service to be tested on the DUT;
    generate the plurality of messages;
    add the set of codec RPCs for encoding the plurality of messages, wherein the set of codec RPCs encodes a binary encoding of a protobuf to a format corresponding to the specification;
    add the set of transport RPCs for sending at least one of a request and a response from the at least one test script to the DUT; and
    generate the proto file comprising the plurality of messages and the added plurality of RPCs.

3. The electronic device as claimed in claim 1, wherein the processor is configured to perform the functional testing based on the invoked at least one RPC for testing the at least one method of the service on the DUT comprises:
    determine the invoked at least one RPC;
    populate at least one message of the plurality of messages associated with the invoked at least one RPC;
    call at least one codec RPC of the set of codec RPCs for encoding the at least one message of the plurality of messages;
    call at least one transport RPC of the set of transport RPCs to send test data;
    send the test data to the DUT for testing the at least one method of the service on the DUT;
    call at least one response RPCs of the set of response RPCs for fetching response from the DUT and at least one response RPCs for retrieval of the messages of the set of RPCs for retrieval of messages from the DUT;
    call at least one codec RPC of the set of codec RPCs for decoding at least one of a fetched response and the retrieved message from the DUT; and
    perform the functional testing by validating the decoded response and the retrieved message from the DUT.

4. The electronic device as claimed in claim 1, wherein the processor is further configured to:
    determine asynchronous communication between the electronic device and the DUT;
    determine a set of messages sent to the DUT queued in the test harness manager; and
    retrieve the set of messages queued in the test harness manager by implementing a message repository, wherein the set of RPCs for retrieval of messages are used for retrieving the set of messages.

5. The electronic device as claimed in claim 1, wherein the plurality of RPCs comprises a set of codec RPCs, a set of transport RPCs, a set of response RPCs and a set of RPCs for retrieval of messages.

6. The electronic device as claimed in claim 1, wherein the test harness manager emulates at least one another network function (NF) based on the at least one test script to be executed on the DUT.

7. The electronic device as claimed in claim 1, wherein each of the plurality of test scripts are configured to populate at least one message of the plurality of messages and call at least one RPC of the plurality of RPCs.

8. A method for performing functional testing of a network function (NF) device by an electronic device, wherein the method comprises:
    receiving, by the electronic device, a specification corresponding to a service to be tested on a device under test (DUT), wherein the specification comprises a plurality of methods of the service to be tested;
    generating, by the electronic device, a proto file based on the specification, wherein the proto file comprises a plurality of messages and definitions associated with a plurality of Remote Procedure Calls (RPCs) for enabling communication with a test harness manager of the electronic device;
    generating, by the electronic device, a plurality of test scripts based on the generated proto file;
    invoking, by the electronic device, at least one RPC of the plurality of RPCs based on at least one test script to be executed on the DUT; and
    performing, by the electronic device, the functional testing based on the invoked at least one RPC for testing the at least one method of the service on the DUT, wherein the DUT is the NF device.

9. The method as claimed in claim 1, wherein generating, by the electronic device, the proto file based on the specification comprises:

parsing, by the electronic device, the received specification corresponding to the service to be tested on the DUT;

generating, by the electronic device, the plurality of messages;

adding, by the electronic device, the set of codec RPCs for encoding the plurality of messages, wherein the set of codec RPCs encodes a binary encoding of a protobuf to a format corresponding to the specification;

adding, by the electronic device, the set of transport RPCs for sending at least one of a request and a response from the at least one test script to the DUT; and generating, by the electronic device, the proto file comprising the plurality of messages and the added plurality of RPCs.

10. The method as claimed in claim 1, wherein performing, by the electronic device, the functional testing based on the invoked at least one RPC for testing the at least one method of the service on the DUT comprises:

determining, by the electronic device, the invoked at least one RPC;

populating, by the electronic device, at least one message of the plurality of messages associated with the invoked at least one RPC;

calling, by the electronic device, at least one codec RPC of the set of codec RPCs for encoding the at least one message of the plurality of messages;

calling, by the electronic device, at least one transport RPC of the set of transport RPCs to send test data;

sending, by the electronic device, the test data to the DUT for testing the at least one method of the service on the DUT;

calling, by the electronic device, at least one response RPCs of the set of response RPCs for fetching response from the DUT and at least one response RPCs for retrieval of the messages of the set of RPCs for retrieval of messages from the DUT;

calling, by the electronic device, at least one codec RPC of the set of codec RPCs for decoding at least one of a fetched response and the retrieved message from the DUT; and performing, by the electronic device, the functional testing by validating the decoded response and the retrieved message from the DUT.

11. The method as claimed in claim 1, further comprises:

determining, by the electronic device, asynchronous communication between the electronic device and the DUT;

determining, by the electronic device, a set of messages sent to the DUT queued in the test harness manager; and retrieving, by the electronic device, the set of messages queued in the test harness manager by implementing a message repository, wherein the set of RPCs for retrieval of messages are used for retrieving the set of messages.

12. The method as claimed in claim 1, wherein the plurality of RPCs comprises a set of codec RPCs, a set of transport RPCs, a set of response RPCs and a set of RPCs for retrieval of messages.

13. The method as claimed in claim 1, wherein the test harness manager emulates at least one another network function (NF) based on the at least one test script to be executed on the DUT.

14. The method as claimed in claim 1, wherein each of the plurality of test scripts are configured to populate at least one message of the plurality of messages and call at least one RPC of the plurality of RPCs.

* * * * *